United States Patent
Kunieda et al.

(10) Patent No.: US 8,961,886 B2
(45) Date of Patent: Feb. 24, 2015

(54) HONEYCOMB STRUCTURE

(71) Applicant: Ibiden Co., Ltd., Ogaki-shi (JP)

(72) Inventors: Masafumi Kunieda, Ibi-Gun (JP); Ken Yoshimura, Ibi-Gun (JP); Toshiyuki Miyashita, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 14/184,079

(22) Filed: Feb. 19, 2014

(65) Prior Publication Data
US 2014/0171292 A1 Jun. 19, 2014

Related U.S. Application Data

(63) Continuation of application No. 12/891,710, filed on Sep. 27, 2010, now Pat. No. 8,691,157.

(30) Foreign Application Priority Data

Nov. 19, 2009 (WO) .................. PCT/JP2009/069661

(51) Int. Cl.
*B01D 50/00* (2006.01)

(52) U.S. Cl.
USPC .......................................... 422/177; 422/180

(58) Field of Classification Search
USPC .............. 422/177, 180; 55/520–523; 428/116
See application file for complete search history.

(56) References Cited

U.S. PATENT DOCUMENTS

| | | | |
|---|---|---|---|
| 4,857,089 A | 8/1989 | Kitagawa et al. |
| 4,867,954 A | 9/1989 | Staniulis et al. |
| 5,116,586 A | 5/1992 | Baacke et al. |
| 5,120,695 A | 6/1992 | Blumrich et al. |
| 5,589,147 A | 12/1996 | Farnos et al. |
| 2004/0209769 A1 | 10/2004 | Demel et al. |
| 2005/0247047 A1 | 11/2005 | Takaya et al. |
| 2006/0029534 A1 | 2/2006 | Eiteneer et al. |
| 2006/0039843 A1 | 2/2006 | Patchett et al. |
| 2006/0068159 A1 | 3/2006 | Komori et al. |
| 2006/0292044 A1 | 12/2006 | Ohno et al. |
| 2007/0129236 A1 | 6/2007 | Liu et al. |
| 2009/0041975 A1 | 2/2009 | Kodama et al. |

(Continued)

FOREIGN PATENT DOCUMENTS

| | | |
|---|---|---|
| DE | 3841990 | 6/1990 |
| DE | 10 2008 009 672 | 8/2009 |

(Continued)

OTHER PUBLICATIONS

Extended European Search Report for corresponding EP Application No. 10174634.5-1213, Mar. 3, 2011.

*Primary Examiner* — Tom Duong
(74) *Attorney, Agent, or Firm* — Mori & Ward, LLP

(57) ABSTRACT

A honeycomb structure includes at least one honeycomb unit having a plurality of through holes defined by partition walls extending along a longitudinal direction of the honeycomb unit. The honeycomb unit includes zeolite, an inorganic binder, and a noble metal catalyst. The zeolite is ion-exchanged with Cu and/or Fe to reduce $NO_x$ on the zeolite by providing ammonia or its precursor. The noble metal catalyst is supported only in a region of the honeycomb unit. The region extends from one end portion of the honeycomb unit in the longitudinal direction over approximately 1.5% or more to approximately 20% or less of an overall length of the honeycomb unit in the longitudinal direction. The region is provided on a downstream side of the honeycomb unit in a direction in which an exhaust gas is configured to flow through the honeycomb unit.

21 Claims, 3 Drawing Sheets

(56) References Cited

U.S. PATENT DOCUMENTS

| | | |
|---|---|---|
| 2009/0186188 A1 | 7/2009 | Shindo |
| 2009/0291830 A1* | 11/2009 | Ohno et al. ............... 502/64 |
| 2010/0290963 A1 | 11/2010 | Andersen et al. |

FOREIGN PATENT DOCUMENTS

| | | |
|---|---|---|
| JP | 56-095342 | 8/1981 |
| JP | 3-221147 | 9/1991 |
| JP | 6-23274 | 2/1994 |
| JP | 7-155614 | 6/1995 |
| JP | 2004-533320 | 11/2004 |
| JP | 2006-51499 | 2/2006 |
| JP | 2009-255034 | 11/2009 |
| WO | WO 2006/137149 | 12/2006 |
| WO | WO 2008/118434 | 10/2008 |
| WO | WO 2009/103699 | 8/2009 |

* cited by examiner

HONEYCOMB STRUCTURE

CROSS-REFERENCE TO RELATED APPLICATION

The present application is a continuation application of U.S. patent application Ser. No. 12/891,710, filed Sep. 27, 2010, which claims priority under 35 U.S.C. §119 to PCT International Application No. PCT/JP2009/069661, filed on Nov. 19, 2009, the entire contents of which are incorporated herein by reference.

BACKGROUND OF THE INVENTION

1. Field of the Invention

The present invention relates to a honeycomb structure.

2. Description of the Related Art

Conventionally, the SCR (Selective Catalytic Reduction) system, which reduces NOx to nitrogen and water using ammonia, is known as one of the systems for converting automobile exhaust gas.

Further, zeolite is known as a material that adsorbs ammonia in the SCR system.

JP2006-51499A discloses, as a method of treating exhaust gas generated by a stationary combustion source equipped with an SCR system, subjecting ammonia emissions to a noble metal catalyst on the downstream side of the SCR system, thereby causing unreacted gaseous ammonia to react with oxygen on the noble metal catalyst to produce reaction products having a higher oxidation state of nitrogen.

Further, WO 06/137149 A1 discloses a honeycomb structure having a honeycomb unit containing inorganic particles and inorganic fibers and/or whiskers, the inorganic particles being one or more of alumina, silica, zirconia, titania, ceria, mullite, and zeolite.

The entire contents of JP2006-51499A and WO 06/137149 A1 are incorporated herein by reference.

SUMMARY OF THE INVENTION

According to one aspect of the present invention, a honeycomb structure includes at least one honeycomb unit. The at least one honeycomb unit has a plurality of through holes defined by partition walls along a longitudinal direction of the honeycomb unit. The honeycomb unit includes zeolite, an inorganic binder, and a noble metal catalyst. The zeolite is ion-exchanged with Cu and/or Fe to reduce $NO_x$ on the zeolite by providing ammonia or its precursor. The noble metal catalyst is supported only in a region of the honeycomb unit. The region extends from one end portion of the honeycomb unit in the longitudinal direction over approximately 1.5% or more to approximately 20% or less of an overall length of the honeycomb unit in the longitudinal direction. The region is provided on a downstream side of the honeycomb unit in a direction in which an exhaust gas is configured to flow through the honeycomb unit.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE EMBODIMENTS

However, the conventional method of JP2006-51499A has a problem in that a large space is necessary for installation of the SCR system because the noble metal catalyst is provided as a separate body on the downstream side of the SCR system.

Further, higher NOx conversion performance is desired than in the case of using zeolite for inorganic particles in the conventional honeycomb structure of WO According to an embodiment of the present invention, it is possible to obtain a honeycomb structure and an exhaust gas converter capable of preventing ammonia slip while maintaining NOx conversion performance and of preventing an increase in the installation space of an SCR system.

Next, a description is given with the drawings of an embodiment of the present invention.

Figure 1:
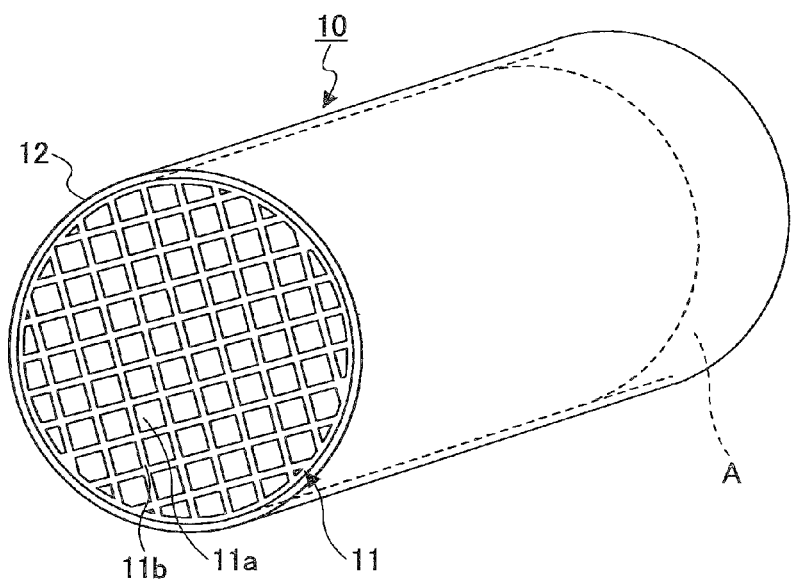
FIG. 1 is a perspective view of a honeycomb structure according to an embodiment of the present invention.
Figure 2:
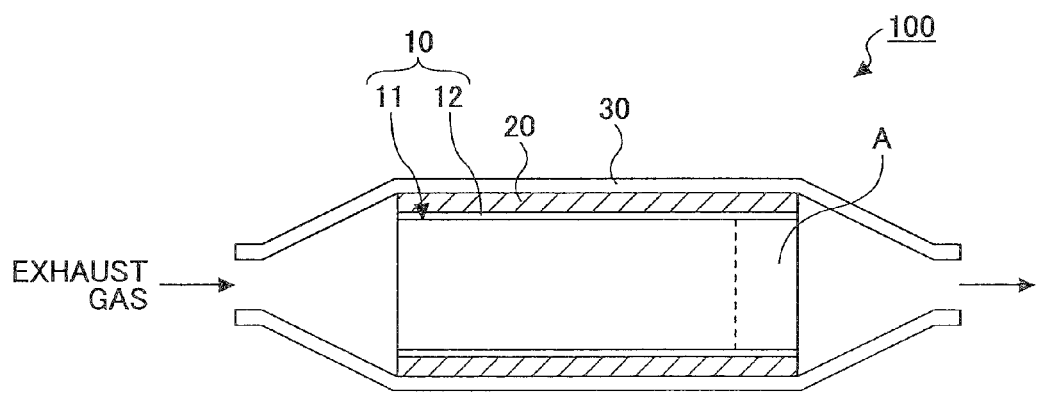
FIG. 2 is a cross-sectional view of an exhaust gas converter according to the embodiment of the present invention.

FIG. 1 illustrates a honeycomb structure according to an embodiment of the present invention, and FIG. 2 illustrates an exhaust gas converter according to the embodiment of the present invention. A honeycomb structure 10 includes a single honeycomb unit 11 containing zeolite as inorganic particles and an inorganic binder. The honeycomb unit 11 has multiple through holes 11a defined by partition walls along a longitudinal direction 11b. The honeycomb structure 10 further includes a peripheral coat layer 12 formed on the peripheral surface of the honeycomb unit 11.

It is preferable that the honeycomb unit 11 have a noble metal catalyst supported only in a region that extends from one end face of the honeycomb unit 11 in its longitudinal direction for approximately 1.5% to approximately 20%, more preferably approximately 3.3% to approximately 16.7%, of the overall length of the honeycomb unit 11. Hereinafter, the region of the honeycomb unit 11 where a noble metal catalyst is supported is referred to as the "region A" of the honeycomb unit 11.

Positioning this region A of the honeycomb unit 11 on the downstream side in a direction in which exhaust gas flows in an exhaust gas converter 100 (FIG. 2) makes it possible to prevent ammonia slip because ammonia is oxidized by the noble metal catalyst supported in the region A of the honeycomb unit 11.

The exhaust gas converter 100 is obtained by canning the honeycomb structure 10 into a metal pipe 30 with a holding sealing member 20 provided around the honeycomb structure 10. Further, ejecting means (not graphically illustrated) such as an eject nozzle for ejecting ammonia or its precursor is provided on the upstream side of the honeycomb structure 10 in the exhaust gas flowing direction in the exhaust gas converter 100. As a result, ammonia is added to the exhaust gas, so that NOx contained in the exhaust gas is reduced on the zeolite contained in the honeycomb unit 11. Considering the stability of storage of ammonia or its precursor, it is preferable to use urea water as a precursor of ammonia. Urea water is hydrolyzed by being heated in exhaust gas so as to generate ammonia.

If the region A of the honeycomb unit 11 from one end portion of the honeycomb unit 11 in its longitudinal direction is approximately 1.5% or more of the overall length of the honeycomb unit 11, the ammonia slip prevention effect is less likely to be unsatisfactory. On the other hand, if the region A of the honeycomb unit 11 from one end portion of the honeycomb unit 11 in its longitudinal direction is approximately 20% or less of the overall length of the honeycomb unit 11, the NOx conversion rate is less likely to be reduced.

The noble metal catalyst that the honeycomb unit 11 supports is not limited in particular as long as the noble metal catalyst can oxidize ammonia, and may be platinum, palladium, rhodium, etc. Two or more of them may be used together.

The zeolite contained in the honeycomb unit 11 is not limited in particular, and may be β-zeolite, zeolite ZSM-5, phosphate-based zeolite, etc. Two or more of them may be used together. Of these, phosphate-based zeolite, whose NOx conversion performance is high, is preferable.

Examples of phosphate-based zeolite include SAPOs such as a SAPO-5, a SAPO-11, and a SAPO-34, MeAPOs, and MeAPSOs.

Considering NOx conversion performance, the zeolite preferably includes zeolite ion-exchanged with Cu and/or Fe. The zeolite may further include zeolite subjected to no ion exchange and/or zeolite ion-exchanged with a metal other than those described above.

The amount of ion exchange of the zeolite ion-exchanged with Cu and/or Fe is preferably approximately 1.0 mass % to approximately 5.0 mass %. If the amount of ion exchange is approximately 1.0 mass % or more, the NOx conversion performance is less likely to be insufficient. If the amount of ion exchange is approximately 5.0 mass % or less, metal to be subjected to ion exchange is less likely to be present as an oxide, so that it is less likely that the metal is less susceptible to ion exchange.

The average particle size of the primary particles or secondary particles of zeolite is preferably approximately 0.5 μm to approximately 10 μm, and more preferably, approximately 1 μm to approximately 5 μm. If the primary particles or secondary particles of zeolite are approximately 0.5 μm or more in average particle size, exhaust gas is likely to penetrate into the partition walls 11b, so that zeolite is likely to be used effectively for NOx conversion. On the other hand, if the primary particles or secondary particles of zeolite are approximately 10 μm or less in average particle size, the number of pores in the honeycomb unit 11 is less likely to be reduced. As a result, exhaust gas is likely to penetrate into the partition walls 11b, so that zeolite is likely to be used effectively for NOx conversion.

The zeolite content per apparent volume of the honeycomb unit 11 is preferably approximately 230 g/L to approximately 360 g/L. If the zeolite content per apparent volume of the honeycomb unit 11 is approximately 230 g/L or more, it is unnecessary to increase the apparent volume of the honeycomb unit 11 in order to improve the NOx conversion rate. On the other hand, if the zeolite content per apparent volume of the honeycomb unit 11 is approximately 360 g/L or less, the strength of the honeycomb unit 11 is less likely to be insufficient or the opening ratio of the honeycomb unit 11 is less likely to be reduced.

The inorganic binder contained in the honeycomb unit 11 is not limited in particular, and may be a solids content contained in alumina sol, silica sol, titania sol, water glass, sepiolite, attapulgite, boehmite, etc. Two or more of them may be used together.

The inorganic binder content of the honeycomb unit 11 is preferably approximately 5 mass % to approximately 30 mass % as a solids content, and more preferably, approximately 10 mass % to approximately 20 mass % as a solids content. If the inorganic binder content is approximately 5 mass % or more as a solids content, the strength of the honeycomb unit 11 is less likely to be reduced. On the other hand, if the inorganic binder content is approximately 30 mass % or less as a solids content, it is less likely to be difficult to perform extrusion molding of the honeycomb unit 11.

It is preferable that the honeycomb unit 11 further include inorganic fibers and/or flakes.

The inorganic fibers contained in the honeycomb unit 11 are not limited in particular as long as the inorganic fibers can increase the strength of the honeycomb unit 11, and may be alumina, silica, silicon carbide, silica alumina, glass, potassium titanate, aluminum borate, etc. Two or more of them may be used together.

The aspect ratio of the inorganic fibers is preferably approximately 2 to approximately 1000, more preferably approximately 5 to approximately 800, and still more preferably approximately 10 to approximately 500. If the aspect ratio of the inorganic fibers is approximately 2 or more, the effect of increasing the strength of the honeycomb unit 11 is less likely to be reduced. On the other hand, if the aspect ratio of the inorganic fibers is approximately 1000 or less, clogging is less likely to occur in a die at the time of the extrusion molding of the honeycomb unit 11 or the inorganic fibers is less likely to break, so that the effect of increasing the strength of the honeycomb unit 11 is less likely to be reduced.

The flakes contained in the honeycomb unit 11 are not limited in particular as long as the flakes can increase the strength of the honeycomb unit 11, and may be glass, muscovite, alumina, silica, zinc oxide, etc. Two or more of them may be used together.

The inorganic fibers and flakes content of the honeycomb unit 11 is preferably approximately 3 mass % to approximately 50 mass %, more preferably approximately 3 mass % to approximately 30 mass %, and still more preferably approximately 5 mass % to approximately 20 mass %. If the inorganic fibers and flakes content is approximately 3 mass % or more, the effect of increasing the strength of the honeycomb unit 11 is less likely to be reduced. On the other hand, if the inorganic fibers and flakes content is approximately 50 mass % or less, the zeolite content of the honeycomb unit 11 is less likely to decrease so that the NOx conversion rate is less likely to be reduced.

The honeycomb unit 11 preferably has a porosity of approximately 25% to approximately 40%. If the porosity of the honeycomb unit 11 is approximately 25% or more, exhaust gas is likely to penetrate into the partition walls 11b, so that zeolite is likely to be used effectively for NOx conversion. On the other hand, if the porosity of the honeycomb unit 11 is approximately 40% or less, the strength of the honeycomb unit 11 is less likely to be insufficient.

The porosity of the honeycomb unit 11 may be measured using mercury intrusion porosimetry.

The honeycomb unit 11 preferably has an opening ratio of approximately 50% to approximately 75% in a cross section perpendicular to its longitudinal direction. If the opening ratio of the cross section perpendicular to the longitudinal direction of the honeycomb unit 11 is approximately 50% or more, zeolite is likely to be used effectively for NOx conversion. On the other hand, if the opening ratio of the cross section perpendicular to the longitudinal direction of the honeycomb unit 11 is approximately 75% or less, the strength of the honeycomb unit 11 is less likely to be insufficient.

The density of the through holes 11a of the honeycomb unit 11 in a cross section perpendicular to its longitudinal direction is preferably approximately 31 cells/cm$^2$ to approximately 124 cells/cm$^2$. If the density of the through holes 11a of the cross section perpendicular to the longitudinal direction of the honeycomb unit 11 is approximately 31 cells/cm$^2$ or more, exhaust gas and zeolite are likely to make contact, so that the NOx conversion rate is less likely to be reduced. On the other hand, if the density of the through holes 11a of the cross section perpendicular to the longitudinal direction of the honeycomb unit 11 is approximately 124 cells/cm$^2$ or less, the pressure loss of the honeycomb structure 10 is less likely to increase.

The partition walls 11b of the honeycomb unit 11 are preferably approximately 0.10 mm to approximately 0.50 mm, and more preferably, approximately 0.15 mm to approximately 0.35 mm in thickness. If the partition walls 11b are approximately 0.10 mm or more in thickness, the strength of the honeycomb unit 11 is less likely to be reduced. On the other hand, if the partition walls 11b are approximately 0.50 mm in thickness or less, exhaust gas is likely to penetrate into the partition walls 11b, so that zeolite is likely to be used effectively for NOx conversion.

The peripheral coat layer 12 is preferably approximately 0.1 mm to approximately 2 mm in thickness. If the peripheral coat layer 12 is approximately 0.1 mm or more in thickness, the effect of increasing the strength of the honeycomb structure 10 is less likely to be insufficient. On the other hand, if the peripheral coat layer 12 is approximately 2 mm in thickness or less, the zeolite content per unit volume of the honeycomb structure 10 is less likely to be reduced, so that the NOx conversion rate is less likely to be reduced.

The honeycomb structure 10, which has a substantially cylindrical shape, is not limited to a particular shape, and may have a substantially rectangular pillar shape, a substantially cylindroid shape, etc. Further, the through holes 11a, which have a substantially quadrangular pillar shape, are not limited to a particular shape, and may have a substantially triangular pillar shape, a substantially hexagonal pillar shape, etc.

Next, a description is given of a method of manufacturing the honeycomb structure 10 of the embodiment of the present invention. First, a raw substantially cylindrical honeycomb molded body having multiple through holes defined by partition walls along a longitudinal direction is manufactured by extrusion molding using raw material paste including zeolite and an inorganic binder and further including inorganic fibers and/or flakes as required. This allows the substantially cylindrical honeycomb unit 11 with sufficient strength to be obtained even with low firing temperatures.

The inorganic binder included in the raw material paste is added as alumina sol, silica sol, titania sol, water glass, sepiolite, attapulgite, boehmite, etc. Two or more of them may be used together.

An organic binder, a dispersion medium, a molding aid, etc., may be suitably added to the raw material paste as required.

The organic binder is not limited in particular, and may be methylcellulose, carboxymethylcellulose, hydroxyethylcellulose, polyethylene glycol, phenolic resin, epoxy resin, etc. Two or more of them may be used together. The amount of addition of the organic binder is preferably approximately 1% to approximately 10% of the total mass of zeolite, an inorganic binder, inorganic fibers and flakes.

The dispersion medium is not limited in particular, and may be water, an organic solvent such as benzene, alcohol such as methanol, etc. Two or more of them may be used together.

The molding aid is not limited in particular, and may be ethylene glycol, dextrin, a fatty acid, fatty acid soap, polyalcohol, etc. Two or more of them may be used in particular.

It is preferable to mix and knead the raw material paste in its preparation. The raw material paste may be mixed using a mixer, an attritor, etc., and may be kneaded using a kneader or the like.

Next, the obtained honeycomb molded body is dried using one or more drying apparatus such as a microwave drying apparatus, a hot air drying apparatus, a dielectric drying apparatus, a reduced-pressure drying apparatus, a vacuum drying apparatus, and a freeze drying apparatus.

Further, the obtained dried honeycomb molded body is degreased. The conditions for degreasing, which are not limited in particular and may be selected suitably in accordance with the kind and the amount of organic matter included in the molded body, are preferably approximately 400° C. and approximately 2 hours.

Next, the substantially cylindrical honeycomb unit 11 is obtained by firing the obtained degreased honeycomb molded body. The firing temperature is preferably approximately 600° C. to approximately 1200° C., and more preferably approximately 600° C. to approximately 1000° C. It the firing temperature is approximately 600° C. or more, sintering is likely to progress so that the strength of the honeycomb unit 11 is less likely to be reduced. On the other hand, if the firing temperature is approximately 1200° C. or less, sintering progresses excessively so that the reaction sites of zeolite is less likely to be reduced.

Next, peripheral coat layer paste is applied on the peripheral surface of the substantially cylindrical honeycomb unit 11.

The peripheral coat layer paste is not limited in particular, and may be a mixture of an inorganic binder and inorganic particles, a mixture of an inorganic binder and inorganic fibers, and a mixture of an inorganic binder, inorganic particles, and inorganic fibers, etc.

The peripheral coat layer paste may further contain an organic binder. The organic binder is not limited in particular, and may be polyvinyl alcohol, methylcellulose, ethylcellulose, carboxymethylcellulose, etc. Two or more of them may be used together.

Next, the honeycomb unit 11 with the peripheral coat layer paste applied is dried and solidified so that the substantially cylindrical honeycomb structure 10 is obtained. At this point, it is preferable to perform degreasing if the peripheral coat layer paste includes an organic binder. The conditions for degreasing, which may be suitably selected in accordance with the kind and the amount of the organic binder, are preferably approximately 700° C. and approximately 20 minutes.

The honeycomb unit 11 may be immersed in an aqueous solution containing Cu ions and/or an aqueous solution containing Fe ions so as to subject its zeolite to ion exchange. Alternatively, raw material paste may be used that contains zeolite ion-exchanged with Cu ions and/or Fe ions.

On the other hand, it is possible to have a noble metal catalyst supported in the region A of the honeycomb unit 11 using an impregnation method or the like. In this case, a supporting body such as alumina supporting a noble metal catalyst may be supported in the region A of the honeycomb unit 11. Alternatively, it is also possible to have a noble metal catalyst supported after having a supporting body such as alumina supported in the region A of the honeycomb unit 11. Further, a noble metal catalyst may be directly supported in the region A of the honeycomb unit 11.

Figure 3:
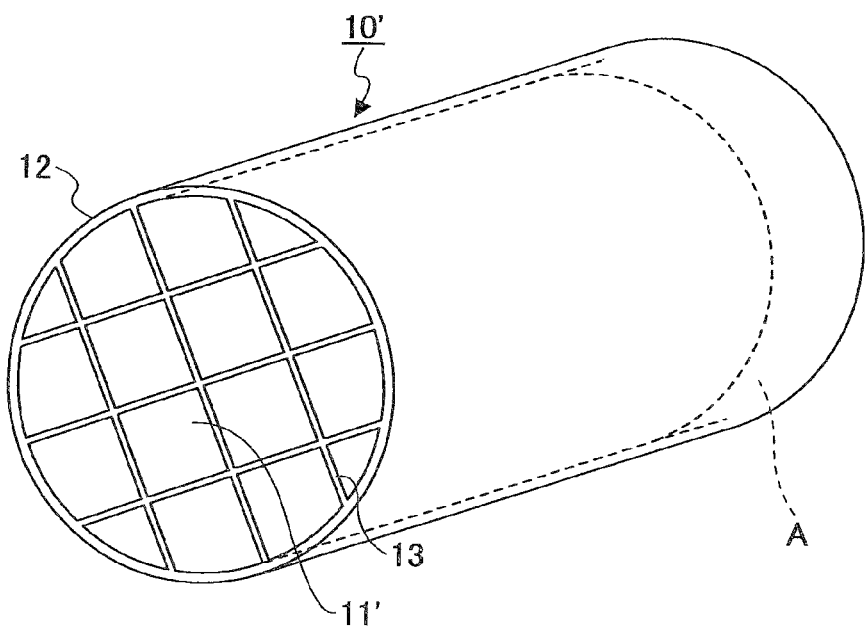
FIG. 3 is a perspective view of a variation of the honeycomb structure according to the embodiment of the present invention.

FIG. 3 illustrates a variation of the honeycomb structure 10 of the embodiment of the present invention. A honeycomb structure 10' is the same as the honeycomb structure 10 except that multiple honeycomb units 11' (FIG. 4) having the multiple through holes 11a defined by partition walls along a longitudinal direction across the partition walls 11b are bonded with an adhesive layer 13 interposed between the honeycomb units 11'.

Figure 4:
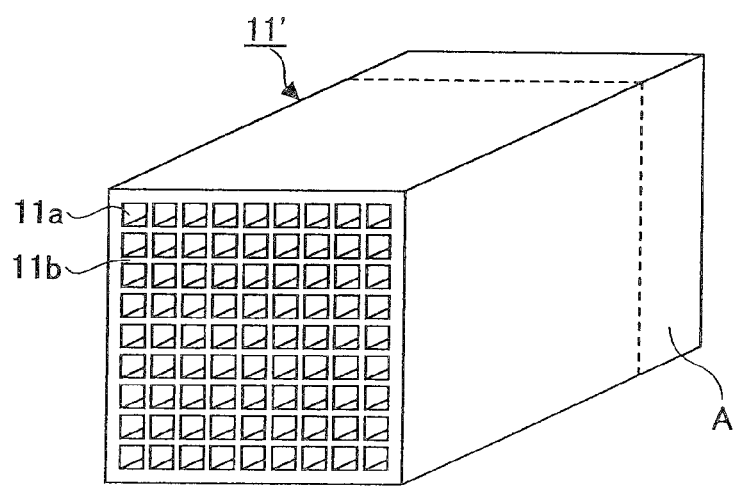
FIG. 4 is a perspective view of a honeycomb unit of the honeycomb structure of FIG. 3 according to the embodiment of the present invention.

Referring to FIG. 4, the honeycomb unit 11' preferably has a cross-sectional area of approximately 5 cm$^2$ to approximately 50 cm$^2$ in a cross section perpendicular to its longitudinal direction. If the cross-sectional area of the cross section perpendicular to the longitudinal direction of the honeycomb unit 11' is approximately 5 cm$^2$ or more, the pressure loss of the honeycomb structure 10' is less likely to increase. On the other hand, if the cross-sectional area of the cross section perpendicular to the longitudinal direction of the honeycomb unit 11' is approximately 50 cm$^2$ or less, the strength of the honeycomb unit 11' against a thermal stress generated in the honeycomb unit 11' is less likely to be insufficient.

The adhesive layer 13 is preferably approximately 0.5 mm to approximately 2 mm in thickness. If the adhesive layer 13 is approximately 0.5 mm or more in thickness, the strength of adhesion is less likely to be insufficient. On the other hand, if the adhesive layer 13 is approximately 2 mm or less in thickness, the pressure loss of the honeycomb structure 10' is less likely to increase.

Except in the peripheral portion of the honeycomb structure 10', the honeycomb unit 11' has a substantially quadrangular pillar shape, but is not limited to a particular shape and may have, for example, a substantially hexagonal pillar shape or the like.

Next, a description is given of a method of manufacturing the honeycomb structure 10' of the embodiment of the present invention. First, the quadrangular-pillar-shaped honeycomb units 11' are manufactured in the same manner as the honeycomb unit 11 of the honeycomb structure 10. Next, adhesive layer paste is applied on peripheral surfaces of the honeycomb units 11', and the honeycomb units 11' are successively bonded. Then, the honeycomb units 11' are dried and solidified, so that an aggregate of the honeycomb units 11' is manufactured.

At this point, the aggregate of the honeycomb units 11' may be cut into a substantially cylindrical shape and ground after its manufacture. The aggregate of the honeycomb units 11' having a substantially cylindrical shape may be manufactured by bonding honeycomb units 11' whose cross sections are substantially fan-shaped and honeycomb units 11' whose cross sections are substantially square.

The adhesive layer paste is not limited in particular, and may be a mixture of an inorganic binder and inorganic particles, a mixture of an inorganic binder and inorganic fibers, and a mixture of an inorganic binder, inorganic particles, and inorganic fibers, etc.

The adhesive layer paste may contain an organic binder. The organic binder is not limited in particular, and may be polyvinyl alcohol, methylcellulose, ethylcellulose, carboxymethylcellulose, etc. Two or more of them may be used together.

Next, peripheral coat layer paste is applied on the peripheral surface of the substantially cylindrical aggregate of the honeycomb units 11'. The peripheral coat layer paste is not limited in particular, and may contain the same materials as or different materials from the adhesive layer paste. The peripheral coat layer paste may have substantially the same composition as the adhesive layer paste.

Next, the aggregate of the honeycomb units 11' having the peripheral coat layer paste applied is dried and solidified so that the substantially cylindrical honeycomb structure 10' is obtained. At this point, it is preferable to perform degreasing if the adhesive layer paste and/or the peripheral coat layer paste includes an organic binder. The conditions for degreasing, which may be suitably selected in accordance with the kind and the amount of the organic binder, are preferably approximately 700° C. and approximately 20 minutes.

The honeycomb structures 10 and 10' may be without the peripheral coat layer 12.

EXAMPLES

Example 1

First, raw material paste 1 was prepared by mixing and kneading 3100 g of a SAPO of 3 μm in average particle size, 895 g of boehmite, 485 g of alumina fibers of 6 μm in average fiber diameter and 100 μm in average fiber length, 380 g of methylcellulose, 280 g of an oleic acid, and 2425 g of ion-exchanged water.

Next, the raw material paste 1 was subjected to extrusion molding using an extruder, so that crude honeycomb molded bodies of a square pillar shape were manufactured. Then, the honeycomb molded bodies were dried at 110° C. for 10 minutes using a microwave drying apparatus and a hot air drying apparatus, and were thereafter degreased at 400° C. for 5 hours. Next, the degreased honeycomb molded bodies were fired at 700° C. for 2 hours, so that honeycomb units 11' having a square pillar shape of 34.3 mm square and 150 mm in length were manufactured. The honeycomb units 11' had a through hole 11a density of 93 cells/cm$^2$ and a partition wall 11b thickness of 0.23 mm.

Next, the zeolite (SAPO) was subjected to ion exchange with Cu ions by immersing each of the honeycomb units 11' in an aqueous copper nitrate solution. The amount of ion exchange of the zeolite determined by ICP emission spectrometry using an ICPS-8100 (manufactured by Shimadzu Corporation) was 2.7 mass %.

Further, the regions A (10 mm in length) of the honeycomb units 11' were immersed in a platinum nitrate solution and were thereafter retained at 600° C. for 1 hour so as to support a platinum catalyst. At this point, the platinum catalyst content per apparent volume of the region A of each of the honeycomb units 11' was 3 g/L.

Next, heat-resisting adhesive layer paste was made by mixing and kneading 767 g of alumina fibers of 0.5 μm in average fiber diameter and 15 μm in average fiber length, 2500 g of silica glass, 17 g of carboxymethylcellulose, 600 g of silica sol of a solids content of 30 wt %, 167 g of polyvinyl alcohol, 167 g of a surfactant, and 17 g of alumina balloons.

The adhesive layer paste was applied so as to have an adhesive layer of 2 mm in thickness, and 16 honeycomb units 11' were bonded. After drying and solidifying the adhesive layer paste at 150° C. for 10 minutes, the honeycomb units 11' were cut into a cylindrical shape using a diamond cutter so that its cross section perpendicular to a longitudinal direction was substantially symmetrical with respect to a point, thereby manufacturing an aggregate of the honeycomb units 11'.

Further, the adhesive layer paste was applied on the peripheral surface of the aggregate of the honeycomb units 11' so as to have a peripheral coat layer of 1 mm in thickness. Thereafter, the adhesive layer paste was dried and solidified at 150° C. for 10 minutes using a microwave drying apparatus and a hot air drying apparatus, and was degreased at 400° C. for 2 hours, so that a cylindrical honeycomb structure 10' of 143.8 mm in diameter and 150 mm in length was manufactured.

Figure 5:
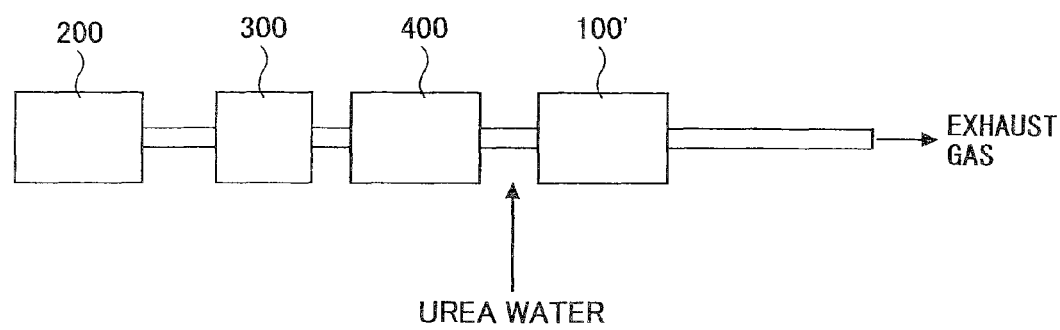
FIG. 5 is a diagram illustrating an evaluation method of examples and comparative examples according to the embodiment of the present invention.

Next, the honeycomb structure 10' was canned in the metal pipe (shell) 30 with the holding sealing member 20 (a mat formed of inorganic fibers) provided around the honeycomb structure 10', thereby manufacturing an exhaust gas converter 100' (FIG. 5). The exhaust gas converter 100' has the same configuration as illustrated in FIG. 2. At this point, the first regions A of the honeycomb units 11' were positioned on the downstream side in the exhaust gas flowing direction.

Example 2

A honeycomb structure 10' and an exhaust gas converter 100' were manufactured in the same manner as in Example 1 except that the regions A of the honeycomb units 11' were changed to 5 mm in length.

Example 3

A honeycomb structure 10' and an exhaust gas converter 100' were manufactured in the same manner as in Example 1 except that the regions A of the honeycomb units 11' were changed to 25 mm in length.

Example 4

Raw material paste 2 was made by mixing and kneading 3000 g of β-zeolite of 3 μm in average particle size, 840 g of boehmite, 650 g of alumina fibers of 6 μm in average fiber diameter and 100 μm in average fiber length, 330 g of methylcellulose, 330 g of an oleic acid, and 1800 g of ion-exchanged water.

A honeycomb structure 10' and an exhaust gas converter 100' were manufactured in the same manner as in Example 1 except for using the raw material paste 2 in place of the raw material paste 1.

Example 5

A honeycomb structure 10' and an exhaust gas converter 100' were manufactured in the same manner as in Example 4 except that the zeolite was subjected to ion exchange with Fe ions by immersing the honeycomb units 11' in an aqueous ferric nitrate solution.

The amount of ion exchange of the zeolite determined by an ICP emission spectrometry using an ICPS-8100 (manufactured by Shimadzu Corporation) was 2.7 mass %.

Example 6

A honeycomb structure 10' and an exhaust gas converter 100' were manufactured in the same manner as in Example 5 except that the regions A of the honeycomb units 11' were changed to 25 mm in length.

Example 7

Raw material paste 3 was made by mixing and kneading 3100 g of a SAPO of 3 μm in average particle size, of which 2.7 mass % was ion-exchanged with Cu; 895 g of boehmite; 485 g of alumina fibers of 6 μm in average fiber diameter and 100 μm in average fiber length; 380 g of methylcellulose; 280 g of an oleic acid; and 2425 g of ion-exchanged water.

A honeycomb structure 10' and an exhaust gas converter 100' were manufactured in the same manner as in Example 2 except for using the raw material paste 3 in place of the raw material paste 1 and not immersing the honeycomb units 11' in an aqueous copper nitrate solution.

Example 8

Raw material paste 4 was made by mixing and kneading 3000 g of β-zeolite of 3 μm in average particle size, of which 2.7 mass % was ion-exchanged with Fe; 840 g of boehmite; 650 g of alumina fibers of 6 μm in average fiber diameter and 100 μm in average fiber length; 330 g of methylcellulose; 330 g of an oleic acid; and 1800 g of ion-exchanged water.

A honeycomb structure 10' and an exhaust gas converter 100' were manufactured in the same manner as in Example 2 except for using the raw material paste 4 in place of the raw material paste 1 and not immersing the honeycomb units 11' in an aqueous copper nitrate solution.

Comparative Example 1

A honeycomb structure and an exhaust gas converter were manufactured in the same manner as in Example 1 except that the regions A of the honeycomb units were changed to 2 mm in length.

The honeycomb structures, the honeycomb units, and the exhaust gas converters of Comparative Example 1 and the following comparative examples are not assigned reference numerals in order to distinguish them from the honeycomb structure 10', the honeycomb units 11', and the exhaust gas converter 100' according to the embodiment of the present invention.

Comparative Example 2

A honeycomb structure and an exhaust gas converter were manufactured in the same manner as in Example 1 except that no platinum catalyst was supported in the regions A of the honeycomb units.

Comparative Example 3

A honeycomb structure and an exhaust gas converter were manufactured in the same manner as in Example 5 except that the regions A of the honeycomb units were changed to 2 mm in length.

Comparative Example 4

A honeycomb structure and an exhaust gas converter were manufactured in the same manner as in Example 5 except that no platinum catalyst was supported in the regions A of the honeycomb units.

Comparative Example 5

A honeycomb structure and an exhaust gas converter were manufactured in the same manner as in Example 7 except that no platinum catalyst was supported in the regions A of the honeycomb units.

Comparative Example 6

A honeycomb structure and an exhaust gas converter were manufactured in the same manner as in Example 8 except that no platinum catalyst was supported in the regions A of the honeycomb units.

[Measurement of NOx Conversion Rate and Evaluation of Ammonia Slip]

A diesel engine (1.6 L direct injection engine) 200 was driven in the NEDC (New European Driving Cycle) mode with the diesel engine 200, a diesel oxidation catalyst (DOC) 300, a diesel particulate filter (DPF) 400, and one of the exhaust gas converters 100' of Examples 1 through 8 and the exhaust gas converters of Comparative Examples 1 through 6 being connected in series via exhaust pipes as illustrated in FIG. 5. For convenience of description, in FIG. 5 and the following description, the honeycomb structures and the exhaust gas converters of Comparative Examples 1 through 6 may also be denoted by reference numerals 10' and 100', respectively, unless otherwise specified. The NOx inflow to and the NOx outflow from each exhaust gas converter 100' were measured using a MEXA-7500DEGR (manufactured by HORIBA, Ltd.), and the NOx conversion rate [%] expressed by (NO inflow−NO outflow)/(NO inflow)×100 was measured (detection limit: 0.1 ppm). At this point, urea water was ejected in the exhaust pipe immediately before the exhaust gas converter 100' so that the molar ratio of urea to NOx equals 1.2, while detecting NOx discharged from the diesel engine 200. The average temperature of the exhaust gas converter 100' was 160° C., the average space velocity (SV) was 20,000/hr, and the volume ratio of nitrogen dioxide to NOx in exhaust gas was 0.25 to 0.30. The urea water was ejected only when the temperature of the exhaust gas converter 100' was 180° C. or more. Further, 6.0 g of ammonia was adsorbed in advance by the honeycomb structure 10' of the exhaust gas converter 100'.

Further, a gas-detecting tube (not graphically illustrated) was provided on the downstream side of the exhaust gas converter 100' to evaluate the presence (YES) or absence (NO) of ammonia slip.

A honeycomb structure of 143.8 mm in diameter and 100 mm in length (a commercially available product) and a honeycomb structure of 143.8 mm in diameter and 152.4 mm in length (a commercially available product) were used as the DOC 300 and the DPF 400, respectively.

In the case of using the exhaust gas converters of Comparative Examples 2 and 4, a honeycomb structure of 143.8 mm in diameter and 50 mm in length (a commercially available product) was further provided via an exhaust pipe on the downstream side of the exhaust gas converter 100' in FIG. 5.

TABLE 1 illustrates the results of the NOx conversion rate measurement and the results of the ammonia slip evaluation. Further, TABLE 1 also illustrates the ratio (%) of the region A, where a noble metal catalyst is supported, to the overall length of the honeycomb unit.

TABLE 1

|  | ZEOLITE | ION EXCHANGE SPECIES | REGION A LENGTH [mm] | REGION A LENGTH/ OVERALL LENGTH [%] | NOx CONVERSION RATE [%] | AMMONIA SLIP |
|---|---|---|---|---|---|---|
| EXAMPLE 1 | SAPO | Cu | 10 | 6.7 | 71 | NO |
| EXAMPLE 2 | SAPO | Cu | 5 | 3.3 | 78 | NO |
| EXAMPLE 3 | SAPO | Cu | 25 | 16.7 | 66 | NO |
| EXAMPLE 4 | β-ZEOLITE | Cu | 5 | 3.3 | 73 | NO |
| EXAMPLE 5 | β-ZEOLITE | Fe | 5 | 3.3 | 66 | NO |
| EXAMPLE 6 | β-ZEOLITE | Fe | 25 | 16.7 | 61 | NO |
| EXAMPLE 7 | SAPO | Cu | 5 | 3.3 | 78 | NO |
| EXAMPLE 8 | β-ZEOLITE | Fe | 5 | 3.3 | 67 | NO |
| COMPARATIVE EXAMPLE 1 | SAPO | Cu | 2 | 1.3 | 78 | YES |
| COMPARATIVE EXAMPLE 2 | SAPO | Cu | 0 | 0 | 79 | NO |
| COMPARATIVE EXAMPLE 3 | β-ZEOLITE | Fe | 2 | 1.3 | 66 | YES |
| COMPARATIVE EXAMPLE 4 | β-ZEOLITE | Fe | 0 | 0 | 67 | NO |
| COMPARATIVE EXAMPLE 5 | SAPO | Cu | 0 | 0 | 80 | YES |
| COMPARATIVE EXAMPLE 6 | β-ZEOLITE | Fe | 0 | 0 | 70 | YES |

TABLE 1 shows that it is possible for the exhaust gas converters 100' of Examples 1 through 8 to prevent ammonia slip while maintaining the NOx conversion rate. It is possible for the exhaust gas converters of Comparative Examples 2 and 4 to prevent ammonia slip with another DOC provided via an exhaust pipe on their downstream side. Without a DOC provided via an exhaust pipe on their downstream side, however, the exhaust gas converters of Comparative Examples 2 and 4 cannot prevent ammonia slip. On the other hand, the exhaust gas converters 100' of Examples 1 through 8 may be without a DOC provided via an exhaust pipe on their downstream side, thus making it possible to prevent an increase in the installation space of the SCR system.

Thus, it is found that the honeycomb structure 10' and the exhaust gas converter 100' according to this embodiment make it possible to prevent ammonia slip while maintaining the NOx conversion performance and make it possible to prevent an increase in the installation space of an SCR system because in the individual honeycomb units 11', a noble metal catalyst is supported only in the region A, which extends from one end of the honeycomb unit 11' in its longitudinal direction for approximately 1.5% to approximately 20% of the overall length of the honeycomb unit 11'.

In this embodiment, the measurement results and the evaluation results are shown for the honeycomb structure 10'. It is believed, however, that the same effects can be produced with respect to the honeycomb structure 10.

Obviously, numerous modifications and variations of the present invention are possible in light of the above teachings. It is therefore to be understood that within the scope of the appended claims, the invention may be practiced otherwise than as specifically described herein.

What is claimed is:

1. A honeycomb structure comprising:
    at least one honeycomb unit having a plurality of through holes defined by partition walls extending along a longitudinal direction of the honeycomb unit, the honeycomb unit comprising:
    zeolite ion-exchanged with Cu and/or Fe to reduce $NO_x$ on the zeolite by providing ammonia or its precursor;
    an inorganic binder; and
    a noble metal catalyst supported only in a region of the honeycomb unit, the region extending from one end portion of the honeycomb unit in the longitudinal direction over approximately 1.5% or more to approximately 20% or less of an overall length of the honeycomb unit in the longitudinal direction, the region being provided on a downstream side of the honeycomb unit in a direction in which an exhaust gas is configured to flow through the honeycomb unit.

2. The honeycomb structure as claimed in claim 1, wherein the zeolite comprises at least one of β-zeolite, zeolite ZSM-5, and phosphate-based zeolite.

3. The honeycomb structure as claimed in claim 2, wherein the phosphate-based zeolite comprises at least one of a SAPO, a MeAPO, and a MeAPSO.

4. The honeycomb structure as claimed in claim 3, wherein the SAPO comprises at least one of a SAPO-5, a SAPO-11, and a SAPO-34.

5. The honeycomb structure as claimed in claim 1, wherein an amount of ion exchange of the zeolite ion-exchanged with the ions of the at least one of Cu and Fe is approximately 1.0 mass % to approximately 5.0 mass %.

6. The honeycomb structure as claimed in claim 1, wherein the inorganic binder comprises a solid contained in at least one of alumina sol, silica sol, titania sol, water glass, sepiolite, attapulgite, and boehmite.

7. The honeycomb structure as claimed in claim 1, wherein the honeycomb unit further comprises at least one of inorganic fibers and flakes.

8. The honeycomb structure as claimed in claim 7, wherein a content of at least one of the inorganic fibers and the flakes of the honeycomb unit is approximately 3 mass % to approximately 50 mass %.

9. The honeycomb structure as claimed in claim 7,
    wherein the inorganic fibers comprise at least one of alumina, silica, silicon carbide, silica alumina, glass, potassium titanate, and aluminum borate, and
    wherein the flakes comprise at least one of glass, muscovite, alumina, silica, and zinc oxide.

10. The honeycomb structure as claimed in claim 1, wherein the honeycomb structure comprises a plurality of honeycomb units.

11. The honeycomb structure as claimed in claim 10, wherein the plurality of honeycomb units comprise
    at least one first honeycomb unit having a cross-sectional area of approximately 5 $cm^2$ to approximately 50 $cm^2$ in a cross section perpendicular to a longitudinal direction of the one first honeycomb unit, and
    a plurality of second honeycomb units defining a periphery of the honeycomb structure and surrounding the first honeycomb unit.

12. The honeycomb structure as claimed in claim 1, wherein the honeycomb structure comprises a single honeycomb unit.

13. The honeycomb structure as claimed in claim 1, further comprising:
    a peripheral coat layer provided on a peripheral surface of the honeycomb unit.

14. The honeycomb structure as claimed in claim 1, wherein the region of the honeycomb unit in which the noble metal catalyst is supported extends from the one end portion of the honeycomb unit in the longitudinal direction of the honeycomb unit over approximately 3.3% or more to approximately 16.7% or less of the overall length of the honeycomb unit in the longitudinal direction.

15. The honeycomb structure as claimed in claim 1, wherein the noble metal catalyst comprises at least one of platinum, palladium, and rhodium.

16. The honeycomb structure as claimed in claim 1, wherein the honeycomb unit has a porosity of approximately 25% to approximately 40%.

17. The honeycomb structure as claimed in claim 1, wherein the honeycomb unit has an opening ratio of approximately 50% to approximately 75% in a cross section perpendicular to the longitudinal direction of the honeycomb unit.

18. The honeycomb structure as claimed in claim 1, wherein a density of the through holes of the honeycomb unit in a cross section of the honeycomb unit perpendicular to the longitudinal direction of the honeycomb unit is approximately 31 cells/$cm^2$ to approximately 124 cells/$cm^2$.

19. The honeycomb structure as claimed in claim 1, wherein the partition walls of the honeycomb unit are approximately 0.10 mm to approximately 0.50 mm in thickness.

20. The honeycomb structure as claimed in claim 1, wherein the noble metal catalyst is directly supported in the region of the honeycomb unit using an impregnation method.

21. The honeycomb structure as claimed in claim 1, wherein the at least one honeycomb unit is provided as a flow-through type structure with both ends of each of the plurality of the through holes being open to allow the exhaust gas to enter one end of each respective through hole of the plurality of through holes and exit an opposite end of each respective through hole of the plurality of through holes.

* * * * *